United States Patent
Gogna et al.

(10) Patent No.: US 8,484,101 B2
(45) Date of Patent: Jul. 9, 2013

(54) COST MANAGEMENT SYSTEM WITH FLEXIBLE UNIT OF MEASURE

(75) Inventors: Jatinder Gogna, Baldwin Place, NY (US); Anil Jain, Baldwin Place, NY (US); Rajesh Seshadri, Cortlandt Manor, NY (US); R. Srinivasa Raghavan, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 308 days.

(21) Appl. No.: 12/194,817

(22) Filed: Aug. 20, 2008

(65) Prior Publication Data

US 2010/0049634 A1 Feb. 25, 2010

(51) Int. Cl.
*G06Q 10/00* (2006.01)
*G07B 17/00* (2006.01)
*G06Q 10/08* (2012.01)
*G06Q 40/00* (2012.01)
*G06Q 40/02* (2012.01)

(52) U.S. Cl.
CPC .............. *G06Q 10/087* (2013.01); *G06Q 40/10* (2013.01); *G06Q 40/02* (2013.01)
USPC ................ 705/28; 705/30; 235/380; 235/383

(58) Field of Classification Search
CPC ........ G06Q 10/087; G06Q 40/10; G06Q 40/00
USPC ............. 705/1, 14, 28, 37, 26, 10, 8, 35, 500, 705/25, 39; 700/99, 107; 715/764; 235/383
See application file for complete search history.

(56) References Cited

U.S. PATENT DOCUMENTS

| | | | |
|---|---|---|---|
| 5,101,352 A | 3/1992 | Rembert | |
| 5,311,438 A | 5/1994 | Sellers et al. | |
| 5,615,109 A * | 3/1997 | Eder | 705/7.12 |
| 5,625,689 A * | 4/1997 | Indeck et al. | 235/380 |
| 5,712,989 A * | 1/1998 | Johnson et al. | 705/28 |
| 6,061,691 A | 5/2000 | Fox | |
| 6,219,653 B1 | 4/2001 | O'Neill et al. | |
| 6,910,017 B1 | 6/2005 | Woo et al. | |
| 7,373,326 B1* | 5/2008 | Tran | 705/37 |
| 7,383,284 B2* | 6/2008 | Heinrichs et al. | 1/1 |
| 7,457,837 B2* | 11/2008 | Baumann | 708/206 |
| 7,487,182 B2* | 2/2009 | Kataria et al. | 1/1 |
| 7,613,626 B1* | 11/2009 | Muniganti et al. | 705/7.35 |
| 2002/0010637 A1* | 1/2002 | Lieu et al. | 705/26 |
| 2002/0138324 A1* | 9/2002 | Zarefoss et al. | 705/8 |
| 2003/0149608 A1 | 8/2003 | Kall et al. | |

(Continued)

OTHER PUBLICATIONS

Unknown Author, "The Integrated System", Retrieved on Jun. 6, 2008, Retrieved from the internet: http://www.virginia.edu/integratedsystem/howdoi/HTML/NAV6511U.htm.*

(Continued)

*Primary Examiner* — Matthew Gart
*Assistant Examiner* — Olusegun Goyea
(74) *Attorney, Agent, or Firm* — Miles & Stockbridge P.C.

(57) ABSTRACT

A system determines the cost of a transaction. The system receives a transaction for an item. The transaction is in terms of a first unit of measure. The system then determines the quantity in terms of a second unit of measure and calculates the cost of the transaction based on the second unit of measure.

17 Claims, 7 Drawing Sheets

U.S. PATENT DOCUMENTS

| | | | |
|---|---|---|---|
| 2003/0200111 A1* | 10/2003 | Damji | 705/1 |
| 2004/0143487 A1 | 7/2004 | Wang | |
| 2005/0209869 A1* | 9/2005 | Irvin | 705/1 |
| 2005/0216359 A1* | 9/2005 | Welter et al. | 705/26 |
| 2005/0220570 A1* | 10/2005 | Kroll | 414/21 |
| 2006/0085294 A1* | 4/2006 | Boerner et al. | 705/28 |
| 2006/0095333 A1* | 5/2006 | Gambhir | 705/25 |
| 2006/0095346 A1* | 5/2006 | Gambhir | 705/28 |
| 2007/0100748 A1* | 5/2007 | Dheer et al. | 705/39 |
| 2007/0192715 A1* | 8/2007 | Kataria et al. | 715/764 |
| 2008/0033782 A1* | 2/2008 | Doyle et al. | 705/10 |
| 2008/0133397 A1* | 6/2008 | Tulloch et al. | 705/37 |
| 2008/0162285 A1* | 7/2008 | Tulloch et al. | 705/14 |
| 2009/0072028 A1* | 3/2009 | Teraoka et al. | 235/383 |

OTHER PUBLICATIONS

Unknown Author, "The Integrated System", Retrieved on Jun. 6, 2008, Retrieved from the internet: http://www.virgina.edu/integratedsystem/howdoi/HTML/NAV6511U.htm.*

Cognition Corporation, "Enterprise Cost Management", http://www.cognition.us/products/ecm_proddesc.htm, 2008, Bedford, MA.

Oracle, "Updating Average Cost", http://download-uk.oracle.com/docs/cd/A60725_05/html/comnls/us/cst/updating,htm.

Oracle, "Peoplesoft Cost Management", http://www.oracle.com/applications/peoplesoft/scm/ent/module/peoplesoft-cost-management-data-sheet.pdf, 2002, 2005, 2007.

ASA Research, "Evaluating Accounting Software: Setting Up and Inventory Item", http://www.asaresearch.com/articles/eval_inventory_item.htm.

University of Virginia and Oracle Corporation, "Items—Creating an Inventory Item", http://www.arenasolutions.com/products/features/cost_mgmt.html, 2004.

Aplicor Inc., "Inventory Control", http://www.aplicor.com/inventory_control.htm.

AccountMate, "Inventory Control Module", http://www.accountmate.com/am65/ICMODULE082004.asp, Copyright 2004 by AccountMate Software Corporation.

Aviva Storm Plus, "Inventory Control", http://www.stormplus.com/ic.htm.

MBS Advisor, "Inventory", http://www.mbsadvisor.com/navision/inventory.htm, Copyright 1999-2005.

Wiss ACC, "Inventory", http://www.wisacc.com/solutions/inventory.html #, Copyright 2006 by Wistech Solutions.

Susan Saperstein, "Oracle Inventory: Consigned Inventory From Supplier Process Guide, Releasew 11i", http://docs.huihoo.com/oracle/docs/B25516_06/current/acrobat/115cipg.pdf, Nov. 2005.

"VAM/SQL 5.0 Inventory Item Specification", http://www.nextstepcomputers.com/VamSQL/vamsql5_is.pdf.

Invoice2Go, "Invoic2go—Inventory Pro", http://www.invoice2go.com/inventory.aspx.

"Inventory Setup Procedures", http://home.flash.net/~trisha/forms/inventory.htm.

Oracle, "Oracle Inventory Management", Oracle Data Sheet, Copyright 2006, Oracle.

Oracle, "Oracle Cost Management for Discrete Manufacturing & Inventory Logistics", Oracle Data Sheet, Copyright 2006, Oracle.

Oracle, "Oracle E-Business Suite Release 12 for Process Companies", Oracle Data Sheet, Copyright 2007, Oracle.

* cited by examiner

COST MANAGEMENT SYSTEM WITH FLEXIBLE UNIT OF MEASURE

FIELD OF THE INVENTION

One embodiment is directed generally to a computerized accounting system, and in particular to a cost management system.

BACKGROUND INFORMATION

A supply chain or logistics network is the system of organizations, people, technology, activities, information, and resources involved in moving a product or service from supplier to customer. Supply chain activities transform natural resources, raw materials and components into a finished product that is delivered to the end customer.

Supply chain management is the process of planning, implementing and controlling the operations of the supply chain as efficiently as possible. Supply chain management spans all movement and storage of raw materials, work-in-process inventory, and finished goods from point-of-origin to point-of-consumption. Supply chain management is typically implemented by integrated computer systems that include modules for such functions as general ledger, inventory management, human resources, customer relationship management, etc.

Inventory management for a supply chain is typically concerned with the quantity and location of inventory including raw materials, work-in-process, and finished goods. Cost management provides a way to track costs in production as well as in finished goods, and provides a link to accounting systems so that the financial aspects of goods can be properly calculated.

SUMMARY OF THE INVENTION

One embodiment is a system that determines the cost of a transaction. The system receives a transaction for an item. The transaction is in terms of a first unit of measure. The system then determines the quantity in terms of a second unit of measure and calculates the cost of the transaction based on the second unit of measure.

DETAILED DESCRIPTION

One embodiment is a cost management system that allows the cost of inventory items to be calculated using one unit of measure and tracked using a different unit of measure. This allows for more flexibility in costing and more accurate cost calculations.

Figure 1:
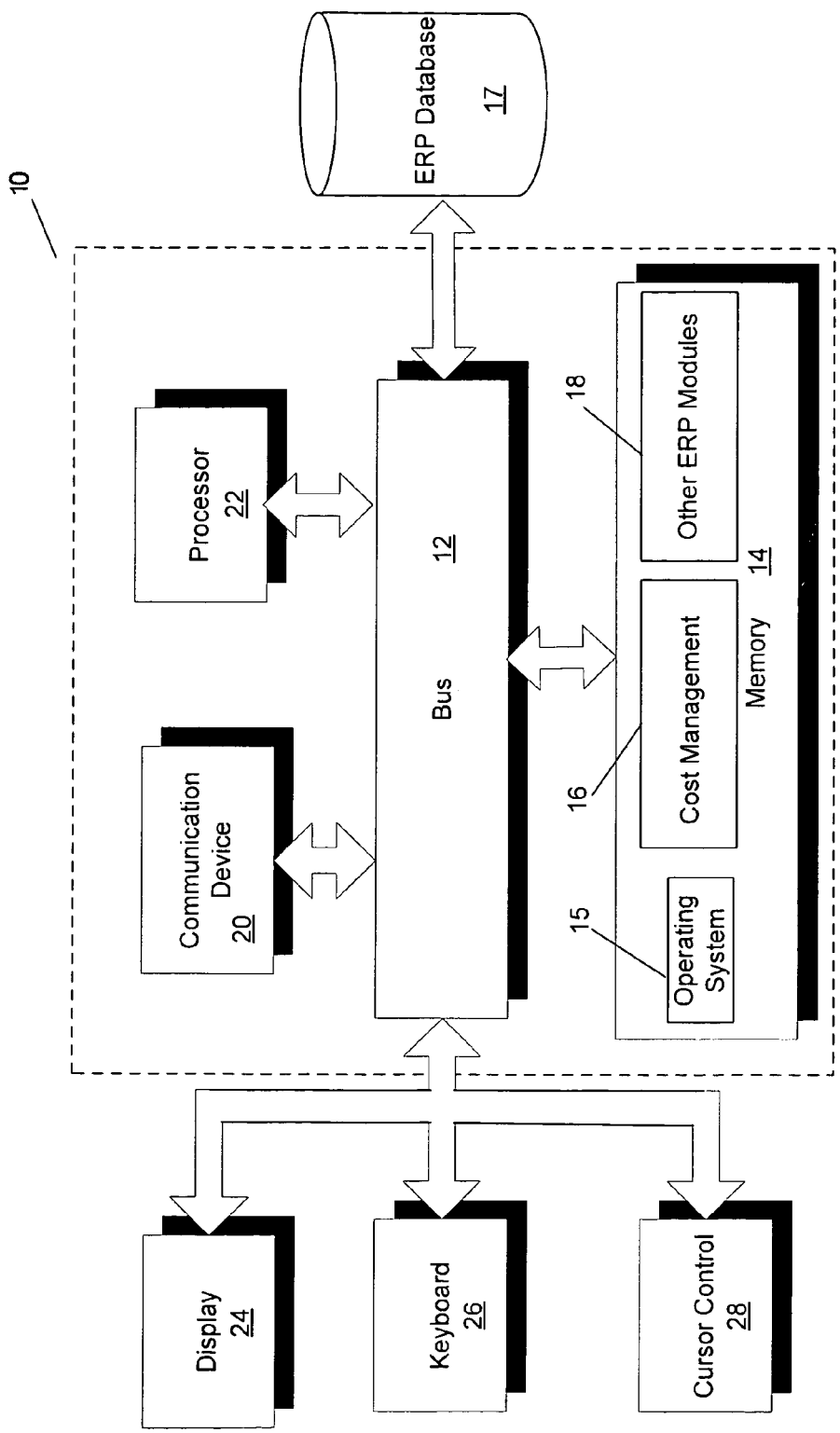
FIG. 1 is a block diagram of a system that can implement an embodiment of the present invention.

FIG. 1 is a block diagram of a system 10 that can implement an embodiment of the present invention. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network such as the Internet, or via any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a cost management module 16 that performs cost management as disclosed in more detail below. The modules further include other enterprise resource planning ("ERP") modules 18 of an ERP system, such as an inventory module and a general ledger module. An ERP system is a computer system that integrates several data sources and processes of an organization into a unified system. A typical ERP system will use multiple modules of computer software and hardware to achieve the integration. A unified ERP database 17, coupled to bus 12, is used to store data for the various system modules. In one embodiment, ERP modules 18 are part of the "Oracle E-Business Suite Release 12" ERP system from Oracle Corp. In other embodiments, cost management 16 may be a stand-alone system and not integrated with an ERP system, or may be part of any other integrated system.

Figure 2:
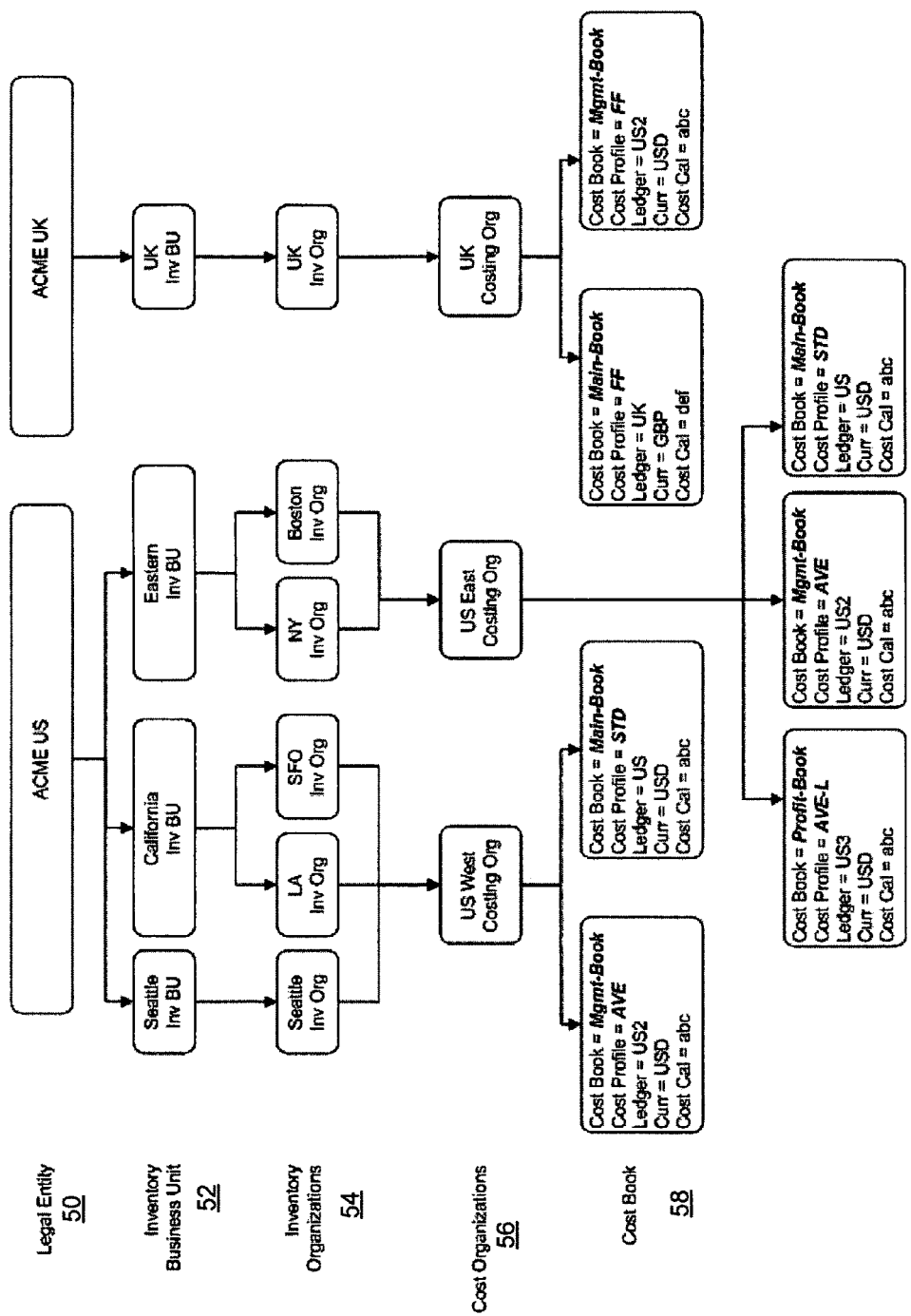
FIG. 2 is a block diagram that illustrates how a cost management module may generate an input structure for an organization to track item costs in accordance with one embodiment.

In one embodiment, cost management 16 tracks the cost of each item or good in the inventory of an organization. An item or good can be anything that is used in a manufacturing process, such as raw materials and components. FIG. 2 is a block diagram that illustrates how cost management 16 may generate an input structure for an organization to track item costs in accordance with one embodiment. An enterprise may be broken down into a one or more legal entities 50. Each legal entity can be divided into inventory business units 52. Each inventory business unit 52 may be a general location where inventory facilities are located. Inventory business units 52 can be linked to inventory organizations 54, which are the actual physical locations where inventory is stored.

Inventory organizations 54 can be linked to cost organizations 56. A cost organization 56 in one embodiment is a grouping of inventory organizations 54 and can be used to indicate the financial ownership of the items and establish common costing policies and responsibilities. Inventory organizations 54 linked to a cost organizations 56 can be from any business unit 52 as long as they belong to the same legal entity 50 in one embodiment. Cost organizations 56 also allow a user to share the item cost in multiple inventory organizations within a legal entity, regardless of their business units.

Cost organizations 56 are linked to cost books 58. A cost book 58 in one embodiment includes all of the costing and accounting data derived from the supply chain transactions and product management setups under a specified set of parameters and rules including the cost methods to use for an item or item category. A user can establish any number of cost books as necessary to obtain as many alternate representations of costing and accounting data.

In one embodiment, multiple cost books 58 may be assigned to a cost organization 56. However, a single primary cost book 58 should be assigned to a cost organization 56. A cost book assignment is treated as a primary book if the ledger assigned to it is the primary ledger of the legal entity to which the cost organization is linked to. Attributes assigned to a cost book include the cost book name, cost profile, ledger (optional for secondary book), ledger currency and ledger calendar.

As an example of costing based on multiple UOMs, the inventory item may be chickens. For this example, the primary UOM is each ("EA") and the secondary UOM is pounds ("LB"). However, there is no standard conversion between EA and LB as far as a single chicken is concerned. The weight of a single chicken could vary considerably from one to another and may result in more or less meat that is available for sale or other purposes. The secondary UOM in this example only has a loose conversion factor with the primary UOM, if at all. In this example, costing should be chosen based on one of the UOM depending on how the items are bought, sold, or priced. Assuming that the chickens are sold and priced using the meat content, it would make sense to cost them by the pounds. However, for tracking and planning purposes it may be better to use the count (EA) instead of pounds.

Table 1 below shows four transactions recorded against the Item and Costs calculated in both EA and LB to highlight key differences between costing by primary and secondary UOMs. Table 1 shows the results of a Perpetual Average Cost Calculation (i.e., price for issues of items at the weighted average cost of all units held) after each transaction and the ending value. As shown in Table 1, using the appropriate secondary UOM quantity (i.e., LB) from the transactions result in a cost and value that is different from applying the standard conversion factor to the values based on the primary UOM.

TABLE 1

| Txn Type | Txn Date | Txn Qty EA | Txn Qty LB | Txn Value | Onhand EA | Item Cost (EA) | Onhand LB | Item Cost (LB) | | |
| --- | --- | --- | --- | --- | --- | --- | --- | --- | --- | --- |
| Receipt | 1 Apr. 2007 | 10 | 105 | 500.00 | 10 | 50.0000 | 105 | 4.7619 | | |
| Receipt | 2 Apr. 2007 | 10 | 96 | 600.00 | 20 | 55.0000 | 201 | 5.4726 | | |
| Receipt | 3 Apr. 2007 | 10 | 102 | 625.00 | 30 | 57.5000 | 303 | 5.6931 | | |
| Ship | 7 Apr. 2007 | 15 | 147 | | 15 | 57.5000 | 156 | 5.6931 | | |
| Ending Value | | | | 862.50 | 15 | | 156 | | 888.1188 | |
| Ending Cost & Value using Std UOM Conv factor | | | | | | | | 5.5288 | 862.5000 | |

(1 EA = 10 LB)

Figure 3:
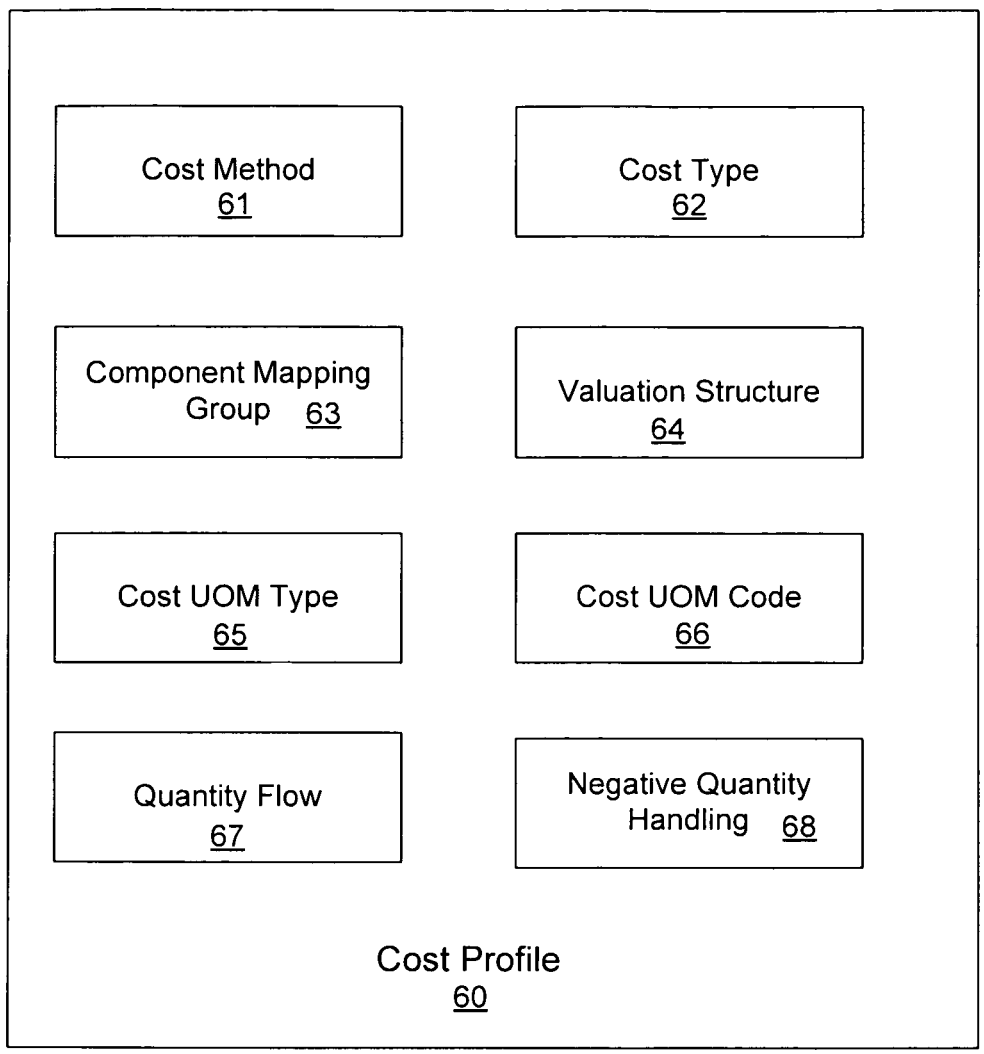
FIG. 3 is a block diagram of a cost profile in accordance with one embodiment.

The cost profile is used to define the costing and accounting preferences/policies. FIG. 3 is a block diagram of a cost profile 60 in accordance with one embodiment. Cost profile 60 in one embodiment includes the following variables 61-68: cost method 61 or inventory valuation method (e.g., standard/periodic, standard/perpetual, perpetual average, last in, first out ("LIFO"), first in, first out ("FIFO")); cost type 62, which indicates the valuation cost type if the cost method is standard; component mapping group 63, which indicates the mapping of the cost component to the cost element; valuation structure 64, which indicates the granularity of the cost; cost Unit of Measure ("UOM") type 65 (e.g., primary, secondary, other); cost UOM code 66 (for type "other"); quantity flow 67; and negative quantity handling 68.

In prior art cost management systems, the costs of item have always been calculated based on the item's primary UOM. However, in one embodiment, cost management 16 is able to track, price, plan and cost items in their secondary UOM or any other alternative UOM besides the primary UOM.

In one embodiment, when setting up a Cost Profile, a user is able to indicate two properties for Costing UOM: (1) The item is set up as being costed using its primary or secondary or alternate UOM; (2) For an alternate UOM, a specific UOM is selected that can be different from what is chosen for the Item as its primary or secondary UOM.

In another example, consider a jewelry business where gold rings are manufactured and sold. The planning and production are done in terms of number of rings (i.e., EA is the UOM). However, for costing and valuation purposes, the grams of gold in each ring are used and the UOM for costing is gm. Assume that five rings are produced with a total cost of manufacture of $1000. Table 2 below shows the five rings:

TABLE 2

| Ring # | EA | gm |
| --- | --- | --- |
| 1 | 1 | 10 |
| 2 | 1 | 11 |
| 3 | 1 | 10 |
| 4 | 1 | 9 |
| 5 | 1 | 10 |

If costing is done in the primary UOM, the cost of each ring will be $200/EA. However, if the cost is calculated in terms of grams, the cost will be $20/gm. Assume that the first 2 rings are sold. If costing is done by primary UOM, the remaining value in inventory will be $600. However, if costing is done by secondary UOM, the remaining value will only be $580.

As another example, a dairy may buy milk from several farmers for their raw material. The dairy receives the milk, tests each receipt from each farmer for quality and quantity, and then store the milk in tanks. The farmers are paid based on quantity and quality. The quality of the milk, measured as a percentage of milk fat, can be represented as the secondary UOM. For example, 100 gallons of milk can have any one of the milk content percentages. The price paid to the farmer depends on gallons and then the percentage of milk fat content. Cheese is one of the dairy's products. When milk is issued to a batch to make cheese, one of the criteria is the milk quality. For costing the milk and establishing the price for cheese with a most suitable profit margin, the dairy needs to cost milk using the secondary UOM since that is how farmers are paid and such costs need to be tracked accurately. In contrast, if the cost of milk is calculated using the primary UOM of gallons, the true cost of the milk based on quality is not accurately represented and the margin for cheese is not accurate and can even result in the dairy realizing a loss if the cheese price that is quoted to their customers is below the cost.

Figure 4:
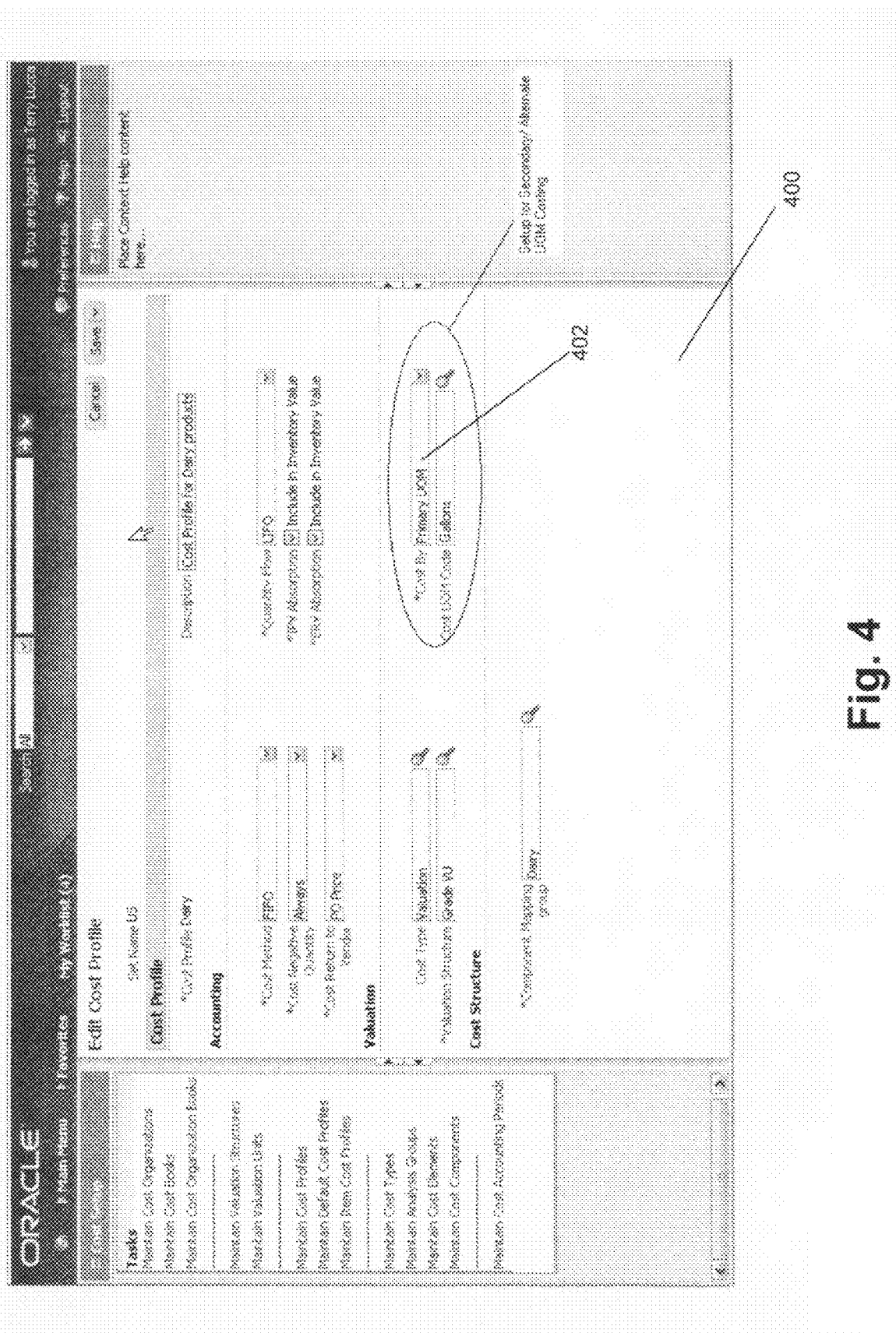
FIG. 4 is a user interface in accordance with one embodiment that allows a user to define an alternative unit of measure instead of the primary unit of measure for costing.

FIG. 4 is a user interface ("UI") 400 in accordance with one embodiment that allows a user to define a secondary or an alternative UOM instead of the primary UOM for costing when editing the cost profile. At 402, using the "Cost By" field, a user can select the UOM for costing (i.e., primary UOM, secondary UOM, other UOM) via a drop down menu.

Figure 5:
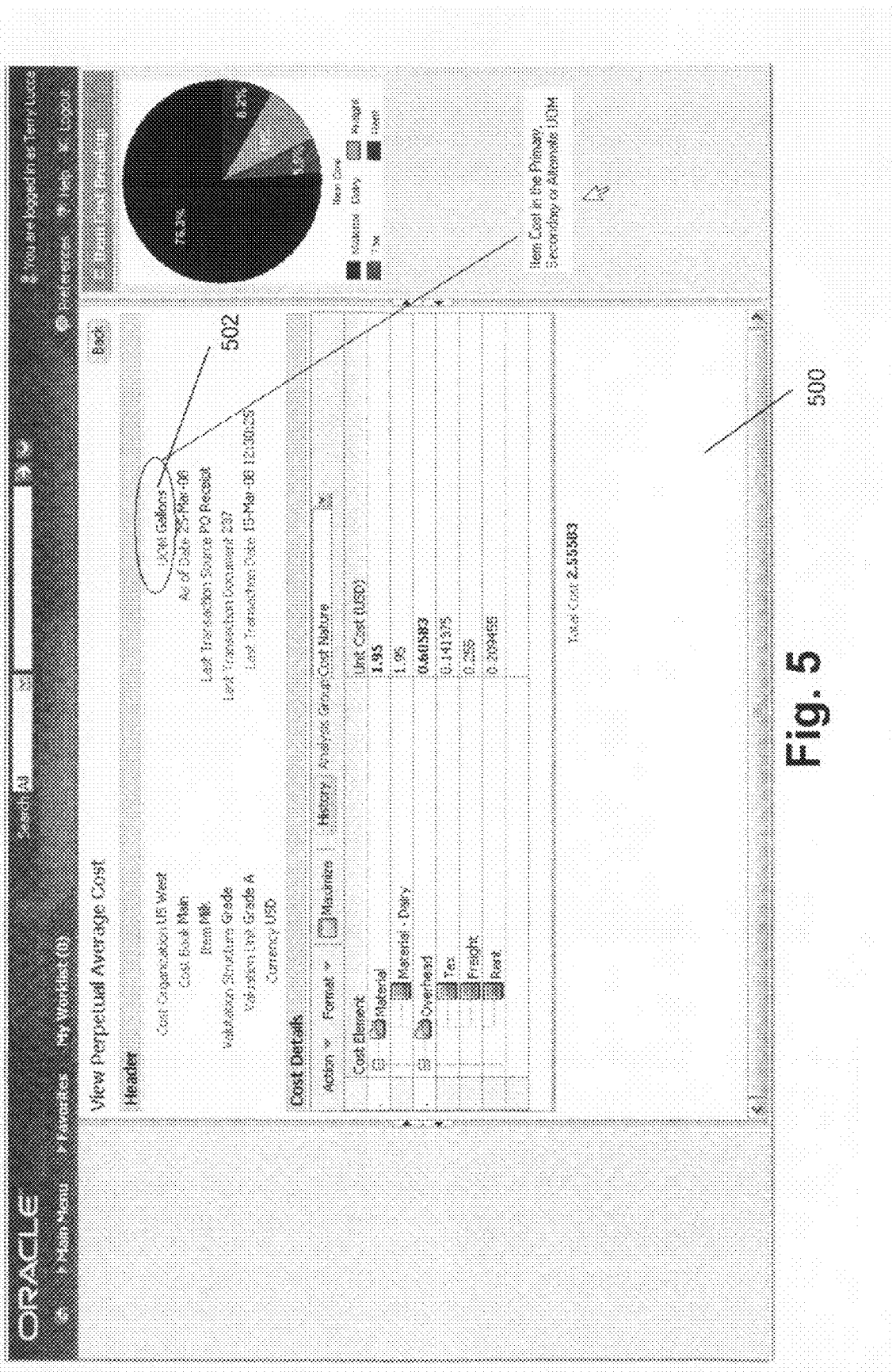
FIG. 5 is a user interface in accordance with one embodiment that shows the unit of measure used for costing.

FIG. 5 is a user interface ("UI") 500 in accordance with one embodiment that shows the UOM used for costing. In the example of FIG. 5, the UOM at field 502 shows the UOM of "Gallons" that is used to calculate the cost of milk. If the UOM was instead percentage of milk fat, it would be shown in field 502.

Figure 6:
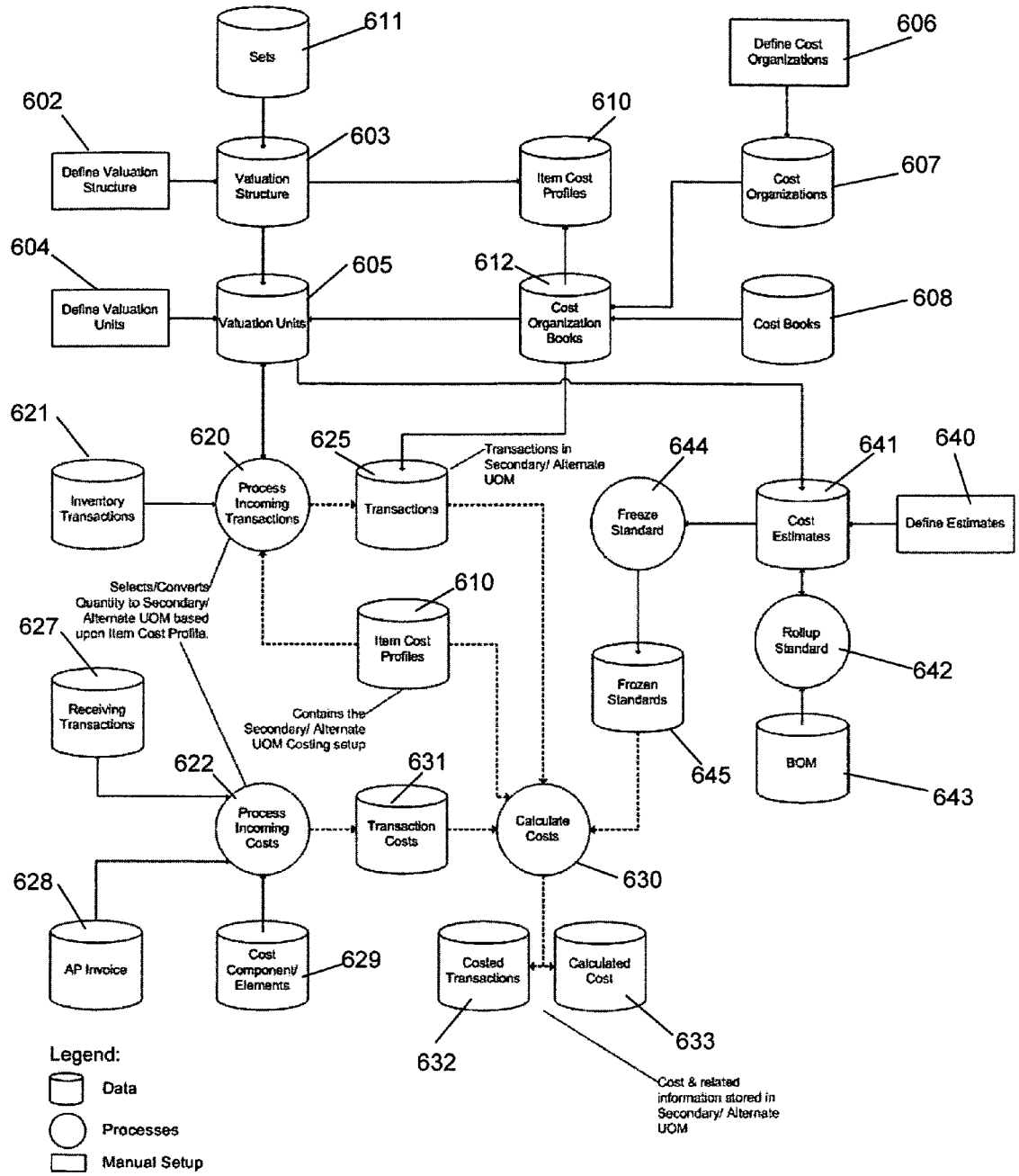
FIG. 6 is a flow diagram of the setup and processing for the cost management system in accordance with one embodiment.

FIG. 6 is a flow diagram of the setup and processing for the cost management system 10 in accordance with one embodiment. In one embodiment, the functionality of the flow diagram of FIG. 6, and FIG. 7 below, is implemented by software stored in memory or other computer readable or tangible medium, and executed by a processor. In other embodiments, the functionality can be performed by hardware, or any combination of hardware and software.

Valuation structures are defined at 602 and stored at 603. Valuation units are defined at 604 and stored at 605. "Sets" are stored at 611. A set is a user defined set of cost organizations for which the user would like to define valuation structure. This provides the user with the capability to define a valuation structure for a single, all, or a set of cost organizations depending on business needs.

Cost organizations are defined at 606 and stored at 607. Cost books are stored at 608. Cost organizations 607 and cost books 608 are combined and stored at 612 as cost organization books. Cost profiles 610 are defined/generated for cost organization books 612 and reference valuation structures 603 for cost calculations.

Inventory transactions from 621 are processed at 620 and stored at 625. Transaction processing 620 uses the cost profiles 610 which in one embodiment includes the secondary UOM costing setup of FIG. 4 so that costing can be specified based on a primary UOM, secondary UOM or other alternative UOM. Valuation units 605 are also used to determine costs based on item attributes. Incoming transactions' costs are processed at 622 from receiving transactions 627 and account payable invoices 628. Cost component/elements 629 map these transaction costs to the cost elements. The transaction costs are stored at 631. Processing at 620 and 622 selects the quantity in the secondary UOM or converts the quantity to an alternative UOM, when specified, based on the Item Cost Profile.

Cost estimates are defined at 640 and stored at 641. The cost estimates are for the "Standard Cost Methods". In this type of cost method, the item cost is not computed from the transaction cost, but is pre-defined based upon estimates for the raw materials. Cost rollup 642 computes the costs or products based on raw material costs and Bill of Materials 643 ("BOM") for products. Freeze standards 644 and 645 is a process by which the calculated standard costs are finalized for accounting purposes. Any deviation of actual costs from standard costs are recorded as variances during accounting.

At 630, costs are calculated. As shown, costs are calculated using as input transaction costs 631 and cost profiles 610. Therefore, the specified UOM is taken into account when determining the costs of the transactions. The calculated costs are stored at 633 and the costed transactions are stored at 632. In one embodiment, these costs are stored in terms of the secondary UOM or other alternative UOM. Costed transactions 632 and calculated costs 633 are available to the general ledger module and other modules of the ERP system in one embodiment to be used for further calculations.

Figure 7:
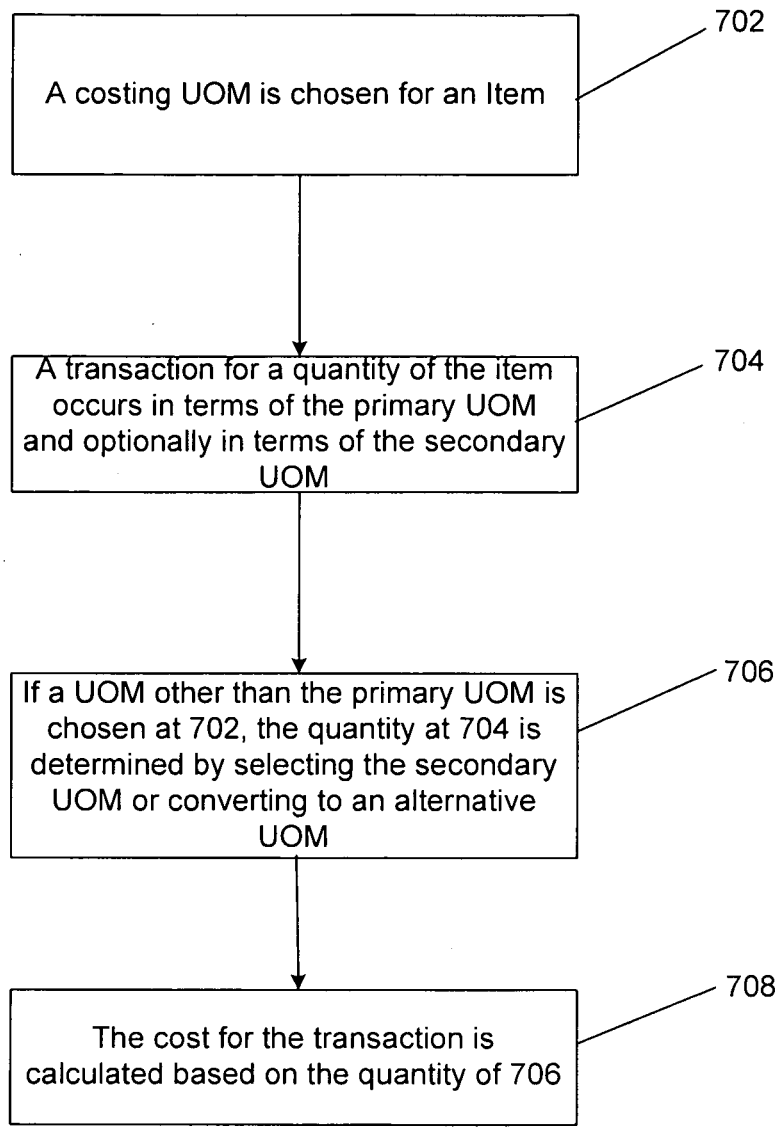
FIG. 7 is a flow diagram of the setup and processing for an cost management system in accordance with another embodiment.

FIG. 7 is a flow diagram of the setup and processing for cost management system 10 in accordance with one embodiment. At 702, for an item, a costing UOM is chosen. In one embodiment, the UOM can be a primary UOM, secondary UOM, or alternative UOM.

At 704, a transaction for a quantity of the item occurs in terms of the primary UOM. The transaction may optionally also include the quantity in the second UOM.

At 706, if a UOM other than the primary UOM is chosen at 702, the quantity at 704 is determined by selecting the secondary UOM or converting to an alternative UOM (i.e., a different UOM from the primary UOM is determined).

At 708, the cost for the transaction is calculated based on the converted quantity of 706.

As disclosed, the cost management system in one embodiment allows alternative UOMs to be specified for determining/calculating the cost of a transaction. Therefore, costs can be more accurately and efficiently calculated.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to determine transaction costs of an inventory item in an inventory system, the instructions comprising:

logic for storing a cost profile for an inventory item, the cost profile including: a first cost method, a first cost unit of measure type, a second cost method and a second cost unit of measure type, wherein the first cost unit of measure type is a first unit of measure and the second cost unit of measure type is a second unit of measure;

logic for receiving a first transaction, wherein an inventory quantity of the inventory item is increased;

logic for storing a value of the first transaction in the inventory system in terms of the first unit of measure and the second unit of measure, wherein the value in terms of the second unit of measure is entered and is not calculated from the value in terms of the first unit of measure;

logic for receiving a second transaction, wherein the inventory quantity of the inventory item is changed;

logic for changing the inventory quantity of the inventory item in response to the second transaction, wherein the inventory quantity is changed in terms of the first unit of measure and the second unit of measure;

logic for determining that a cost of the second transaction for the inventory item is calculated using the first unit of measure;

logic for receiving a third transaction, wherein the inventory quantity of the inventory item is changed;

logic for changing the inventory quantity of the inventory item in response to the third transaction, wherein the inventory quantity is changed in terms of the first unit of measure and the second unit of measure; and logic for determining that a cost of the third transaction for the inventory item is calculated using the second unit of measure;

wherein the calculated cost of the third transaction using the second unit of measure is not determined by a standard conversion of what the calculated cost of the third transaction would be if it was calculated using the first unit of measure.

2. The non-transitory computer readable medium of claim 1, wherein the first unit of measure comprises each and the second unit of measure comprises pounds or grams.

3. The non-transitory computer readable medium of claim 1, wherein the first unit of measure comprises gallons and the second unit of measure comprises percentage of fat.

4. The non-transitory computer readable medium of claim 1, further comprising: logic for receiving a selection of the second unit of measure for determining transaction costs for the inventory item.

5. The non-transitory computer readable medium of claim 1, wherein the cost of the third transaction for the inventory item is stored in a database of an enterprise resource planning system in terms of the second unit of measure.

6. The non-transitory computer readable medium of claim 5, wherein a level of inventory for the inventory item is stored in the database in terms of the first unit of measure.

7. The non-transitory computer readable medium of claim 1, wherein the logic for determining that a cost of the second transaction for the inventory item is calculated using the first unit of measure is in part defined in the cost profile that is part of a cost book of a cost organization.

8. A computer implemented method for determining the cost of transactions for an inventory item in an inventory system, the method comprising:

using a computer to perform the steps of:

storing, in a computer database coupled to the computer, a cost profile for an inventory item, the cost profile including: a first cost method, a first cost unit of measure type, a second cost method and a second cost unit of measure type, wherein the first cost unit of measure type is a first unit of measure and the second cost unit of measure type is a second unit of measure;

receiving a first transaction, wherein an inventory quantity of the inventory item is increased;

storing a value of the first transaction in the inventory system in terms of the first unit of measure and the second unit of measure, wherein the value in terms of the second unit of measure is entered and is not calculated from the value in terms of the first unit of measure;

receiving a second transaction, wherein the inventory quantity of the inventory item is changed;

changing the inventory quantity of the inventory item in response to the second transaction, wherein the inventory quantity is changed in terms of the first unit of measure and the second unit of measure;

determining that a cost of the second transaction for the inventory item is calculated using the first unit of measure;

receiving a third transaction, wherein the inventory quantity of the inventory item is changed;

changing the inventory quantity of the inventory item in response to the third transaction, wherein the inventory quantity is changed in terms of the first unit of measure and the second unit of measure; and determining that a cost of the third transaction for the inventory item is calculated using the second unit of measure;

wherein the calculated cost of the third transaction using the second unit of measure is not determined by a standard conversion of what the calculated cost of the third transaction would be if it was calculated using the first unit of measure.

9. The method of claim 8, wherein the first unit of measure comprises each and the second unit of measure comprises pounds or grams.

10. The method of claim 8, wherein the first unit of measure comprises gallons and the second unit of measure comprises percentage of fat.

11. An inventory system for determining transaction costs for an inventory item, the system comprising:

means for storing a cost profile for an inventory item, the cost profile including: a first cost method, a first cost unit of measure type, a second cost method and a second cost unit of measure type, wherein the first cost unit of measure type is the first unit of measure, and the second cost unit of measure type is the second unit of measure;

means for receiving a first transaction, wherein an inventory quantity of the inventory item is increased;

means for storing a value of the first transaction in the inventory system in terms of the first unit of measure and the second unit of measure, wherein the value in terms of the second unit of measure is entered and is not calculated from the value in terms of the first unit of measure;

means for receiving a second transaction, wherein the inventory quantity of the inventory item is changed;

means for changing the inventory quantity of the inventory item in response to the second transaction, wherein the inventory quantity is changed in terms of the first unit of measure and the second unit of measure;

means for determining that a cost of the second transaction for the inventory item is calculated using the first unit of measure; and means for receiving a third transaction, wherein the inventory quantity of the inventory item is changed;

means for changing the inventory quantity of the inventory item in response to the third transaction, wherein the inventory quantity is changed in terms of the first unit of measure and the second unit of measure; and means for determining that a cost of the third transaction for the inventory item is calculated using the second unit of measure;

wherein the calculated cost of the third transaction using the second unit of measure is not determined by a standard conversion of what the calculated cost of the third transaction would be if it was calculated using the first unit of measure.

12. The system of claim 11, wherein the first unit of measure comprises each and the second unit of measure comprises pounds or grams.

13. The system of claim 11, wherein the first unit of measure comprises gallons and the second unit of measure comprises percentage of fat.

14. A computer implemented method of determining transaction costs for an inventory item in an inventory system, the method comprising:

using a computer to perform the steps of:

receiving a first transaction, wherein an inventory quantity of the inventory item is increased;

storing, in a computer database coupled to the computer, a value of the first transaction in the inventory system in terms of a first unit of measure and a second unit of measure, wherein the value in terms of the second unit of measure is entered and is not calculated from the value in terms of the first unit of measure;

storing in the computer database coupled to the computer for the inventory item, a first cost method, a first cost unit of measure type, a second cost method and a second cost unit of measure type, wherein the first cost unit of measure type is the first unit of measure, and the second cost unit of measure type is the second unit of measure;

receiving a second transaction, wherein the inventory quantity of the inventory item is changed;

changing the inventory quantity of the inventory item in response to the second transaction, wherein the inventory quantity is changed in terms of the first unit of measure and the second unit of measure;

determining that a cost of the second transaction for the inventory item is calculated using the first unit of measure;

receiving a third transaction, wherein the inventory quantity of the inventory item is changed;

changing the inventory quantity of the inventory item in response to the third transaction, wherein the inventory quantity is changed in terms of the first unit of measure and the second unit of measure; and determining that a cost of the third transaction for the inventory item is calculated using the second unit of measure;

wherein the calculated cost of the third transaction using the second unit of measure is not determined by a standard conversion of what the calculated cost of the third transaction would be if it was calculated using the first unit of measure.

15. The method of claim 14, wherein the first unit of measure comprises each and the second unit of measure comprises pounds or grams.

16. The method of claim 14, wherein the first unit of measure comprises gallons and the second unit of measure comprises percentage of fat.

17. The method of claim 14, wherein the cost of the third transaction is stored in a database of an enterprise resource planning system in terms of the second unit of measure.

* * * * *

UNITED STATES PATENT AND TRADEMARK OFFICE
CERTIFICATE OF CORRECTION

PATENT NO. : 8,484,101 B2  
APPLICATION NO. : 12/194817  
DATED : July 9, 2013  
INVENTOR(S) : Gogna et al.

Page 1 of 1

It is certified that error appears in the above-identified patent and that said Letters Patent is hereby corrected as shown below:

On Title page 2, column 2, under Other Publications, line 16, delete "Releasew" and insert -- Release --, therefor.

On Title page 2, column 2, under Other Publications, line 20, delete "Invoic2go" and insert -- Invoice2go --, therefor.

Signed and Sealed this  
Twenty-ninth Day of October, 2013

Teresa Stanek Rea  
*Deputy Director of the United States Patent and Trademark Office*